US009788142B2

(12) United States Patent
Chiu et al.

(10) Patent No.: US 9,788,142 B2
(45) Date of Patent: Oct. 10, 2017

(54) SYSTEM OF LOCATION PUSH NOTIFICATION SERVICE, USER MOBILE DEVICE, AND METHOD OF LOCATION PUSH NOTIFICATION SERVICE

(71) Applicant: INSTITUTE FOR INFORMATION INDUSTRY, Taipei (TW)

(72) Inventors: Chien-Chung Chiu, Yilan County (TW); Jing-Ming Chiu, Taipei (TW); Yeh-Kuang Wu, New Taipei (TW); Hsiao-Chen Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 33 days.

(21) Appl. No.: 15/135,103

(22) Filed: Apr. 21, 2016

(65) Prior Publication Data
US 2017/0142542 A1    May 18, 2017

(30) Foreign Application Priority Data
Nov. 18, 2015    (TW) .............................. 104138059 A

(51) Int. Cl.
*H04W 4/00*      (2009.01)
*H04L 29/08*     (2006.01)
*H04W 4/02*      (2009.01)

(52) U.S. Cl.
CPC ............ *H04W 4/008* (2013.01); *H04L 67/26* (2013.01); *H04W 4/026* (2013.01)

(58) Field of Classification Search
CPC ... H04W 4/008; H04W 4/026; H04W 52/245; H04W 4/025; H04L 67/26; H04B 7/0834; H04B 7/18556; H04B 17/318
See application file for complete search history.

(56) References Cited

U.S. PATENT DOCUMENTS

2008/0252527 A1* 10/2008 Garcia ...................... G01S 1/68
 342/450
2009/0247186 A1* 10/2009 Ji .............................. G01S 5/02
 455/456.1
2012/0282922 A1* 11/2012 Fodor ..................... H04W 8/22
 455/426.1

(Continued)

OTHER PUBLICATIONS

Taiwan Patent Office, Office action dated Nov. 22, 2016.

*Primary Examiner* — Andrew Wendell
(74) *Attorney, Agent, or Firm* — Li & Cai Intellectual Property (USA) Office

(57) ABSTRACT

A system of location push notification service is provided. The system comprises a Bluetooth device, a server and a user mobile device. The server stores a location data and a standard angle corresponding to the Bluetooth device. The user mobile device linked to the server via a communication network has an electronic compass and an acceleration sensor for obtaining a detection angle, and a signal intensity detection module for obtaining the intensity of the Bluetooth signal. The user mobile device transmits the detection angle and the intensity of the Bluetooth signal to the server when the user mobile device senses the Bluetooth signal. The server obtains a relative angle of the user mobile device corresponding to the Bluetooth device, and determines a service information pushed from the server to the user mobile device according to the relative angle and variations in the intensity of the Bluetooth signal.

19 Claims, 7 Drawing Sheets

(56) References Cited

U.S. PATENT DOCUMENTS

| | | | |
|---|---|---|---|
| 2013/0040682 A1* | 2/2013 | Chang | H01Q 1/243 |
| | | | 455/517 |
| 2013/0181867 A1* | 7/2013 | Sturdivant | H04W 64/00 |
| | | | 342/368 |
| 2014/0135042 A1 | 5/2014 | Buchheim et al. | |
| 2014/0274136 A1* | 9/2014 | Edge | H04W 4/04 |
| | | | 455/456.2 |
| 2015/0334527 A1* | 11/2015 | Chang | G01S 3/20 |
| | | | 455/456.1 |
| 2017/0019765 A1* | 1/2017 | Hoyer | H04B 5/0075 |
| 2017/0092090 A1* | 3/2017 | Lerner | G06K 7/10366 |

* cited by examiner

SYSTEM OF LOCATION PUSH NOTIFICATION SERVICE, USER MOBILE DEVICE, AND METHOD OF LOCATION PUSH NOTIFICATION SERVICE

BACKGROUND OF THE INVENTION

1. Field of the Invention

The instant disclosure relates to a push notification service; in particular, to a system of location push notification service, a user mobile device, and a method of location push notification service.

2. Description of Related Art

Conventional Bluetooth™ devices such as Beacon are low power communication devices which can be used for indoor or short distance wireless communication. When the Bluetooth™ device transmits a Bluetooth™ signal, the Bluetooth™ device can transmit an identification code to indicate the source of the Bluetooth™ signal being the Bluetooth™ device. For the purpose of indoor positioning of a mobile device used by a user, multiple Bluetooth™ devices can be utilized. Receiving the identification codes of the Bluetooth devices, the mobile device used by a user can calculate its own location according to preset locations of the Bluetooth devices having different identification codes. After the position of the mobile device has been determined, a push notification service can be applied according to the position of the mobile device, in order to provide appropriate information to the user. However, related prior arts need to use multiple Bluetooth™ devices for positioning the mobile device. Also, even though multiple Bluetooth™ devices are utilized, the implementation cost would be raised, and precise positioning is still not easily achieved due to the issue of mutual interference between multiple signals. For the field of performing push notification service, such as a department store or a physical store, requiring more accurate positioning regarding different directions and regions, the conventional manner of using multiple Bluetooth™ devices has no favorable benefit.

SUMMARY OF THE INVENTION

The object of the instant disclosure is to provide a system of a location push notification service, a user mobile device, and a method of a location push notification service. Only one Bluetooth™ device is needed to be used. Without using multiple Bluetooth™ devices, the positioning of the mobile device can be obtained. Therefore, a push notification service for multiple-directions can be achieved.

In order to achieve the aforementioned objects, according to an embodiment of the instant disclosure, a system of location push notification service is provided. The system of location push notification service comprises a Bluetooth™ device, a server and a user mobile device. The Bluetooth™ device transmits a Bluetooth™ signal. The server stores a location data and a standard angle corresponding to the Bluetooth™ device. The user mobile device is linked to the server via a communication network. The user mobile device has an electronic compass and an acceleration sensor for obtaining a detection angle. The user mobile device has a signal intensity detection module for obtaining the intensity of the Bluetooth™ signal. The user mobile device transmits the detection angle and the intensity of the Bluetooth™ signal to the server when the user mobile device senses the Bluetooth™ signal. The server obtains a relative angle of the user mobile device corresponding to the Bluetooth™ device according to the standard angle and the detection angle. The server determines a service information pushed from the server to the user mobile device according to the relative angle and variations in the intensity of the Bluetooth™ signal.

In order to achieve the aforementioned objects, according to an embodiment of the instant disclosure, a user mobile device is provided. The user mobile device is used in a system of location push notification service. The system of location push notification service comprises a server and a Bluetooth™ device. The server stores a location data and a standard angle corresponding to the Bluetooth™ device. The Bluetooth™ device transmits a Bluetooth™ signal. The user mobile device comprises an electronic compass, an acceleration sensor, a signal intensity detection module, a display unit and an operation processor. The acceleration sensor obtains a detection angle according to the electronic compass. The signal intensity detection module obtains the intensity of the Bluetooth™ signal. The display unit is for display of a service information. The operation processor is coupled to the electronic compass, the acceleration sensor, the signal intensity detection module and the display unit. When the user mobile device senses the Bluetooth™ signal, the user mobile device transmits the detection angle and the intensity of the Bluetooth™ signal to the server, and then the server obtains a relative angle of the user mobile device corresponding to the Bluetooth™ device according to the standard angle and the detection angle. The server determines the service information pushed from the server to the user mobile device according to the relative angle and variations in the intensity of the Bluetooth™ signal.

In order to achieve the aforementioned objects, according to an embodiment of the instant disclosure, a method of location push notification service is provided. The method of location push notification service comprises transmitting a Bluetooth™ signal by a Bluetooth™ device; storing a location data and a standard angle corresponding to the Bluetooth™ device by a server; obtaining a detection angle by an electronic compass and an acceleration sensor of the user mobile device, and obtaining the intensity of the Bluetooth™ signal by a signal intensity detection module of the user mobile device; when the user mobile device senses the Bluetooth™ signal, the user mobile device transmitting the detection angle and the intensity of the Bluetooth™ signal to the server via a communication network; and the server obtaining a relative angle of the user mobile device corresponding to the Bluetooth™ device according to the standard angle and the detection angle, the server determining a service information pushed from the server to the user mobile device according to the relative angle and variations in the intensity of the Bluetooth™ signal.

In summary, the instant disclosure provides a system of location push notification service, a user mobile device, and a method of location push notification service. By using only one Bluetooth™ device, the standard angle can be obtained. Also, by using the detection angle of the user mobile device and variation in the intensity of the Bluetooth™ signal, the service information pushed from the server to the user mobile device can be determined.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[An Embodiment of a System of Location Push Notification Service and a User Mobile Device]

Figure 1:
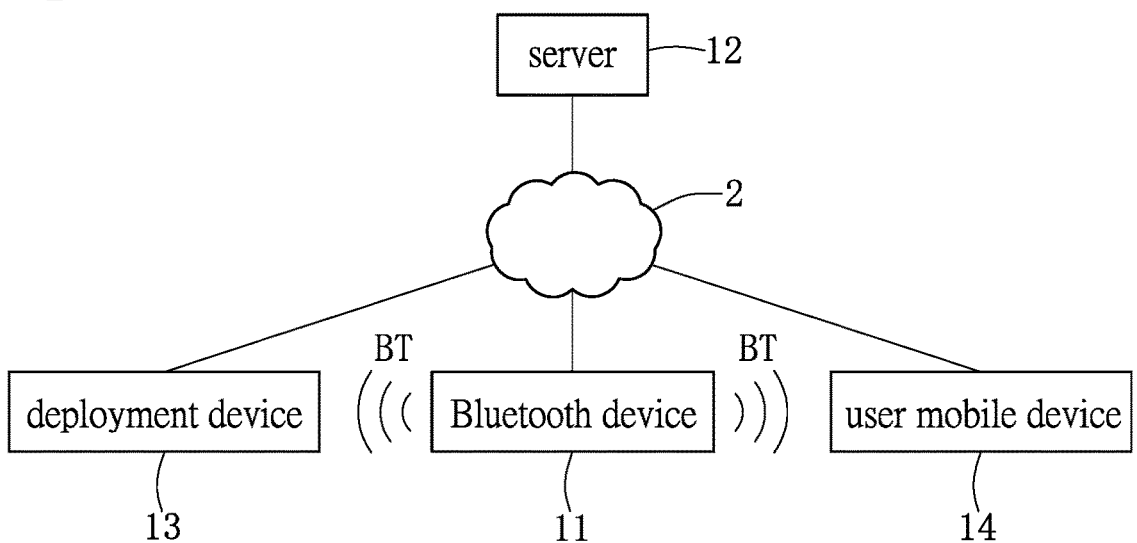
FIG. 1 shows an architecture diagram of a system of location push notification service according to an embodiment of the instant disclosure.

Please refer to FIG. 1 showing an architecture diagram of a system of location push notification service according to an embodiment of the instant disclosure. The system of location push notification service 1 comprises a Bluetooth™ device 11, a server 12, a deployment device 13 and a user mobile device 14. The Bluetooth™ device 11, the deployment device 13 and the user mobile device 14 both link to the server 12 via a communication network 2. The communication network is a wireless communication network of any kind, such as Wi-Fi, 3G (third generation of mobile telecommunications technology), or 4G (fourth generation of mobile telecommunications technology) data communications network. However, the instant disclosure is not so restricted. When the communication network 2 is connected with the Internet, the server 12 can be a network server at the far end or a cloud server. This instant disclosure does not restrict the implementation manner of the server 12.

The Bluetooth™ device 11 transmits a Bluetooth™ signal BT. The Bluetooth™ device 11 of this embodiment can be a Beacon as an example. In general, any micro location signal emitter using low power Bluetooth™ technology (BLE or Bluetooth™ 4.0) can be regarded as the Beacon. However, this instant disclosure does not restrict the kind of the Bluetooth™ device.

The deployment device 13 and the user mobile device 15 can receive the Bluetooth™ signal generated by the Bluetooth™ device 11. The deployment device 13 is only required in the system construction phase. When a location data corresponding to the Bluetooth™ device 11 and a standard angle is stored in the server 12, the deployment device 13 does not need to be used. The system of location push notification service 1 can comprise multiple user mobile devices 13. However, in this embodiment, the operation mechanism of the system is explained in the circumstance of using one user mobile device 14.

The server 12 stores the location data and the standard angle corresponding to the Bluetooth™ device 11. Before explaining the system of location push notification service 1 performing determination of the position and push notification service, the manner of establishing the location data and the standard angle related to the Bluetooth™ device 11 is described as follows.

Figure 2:
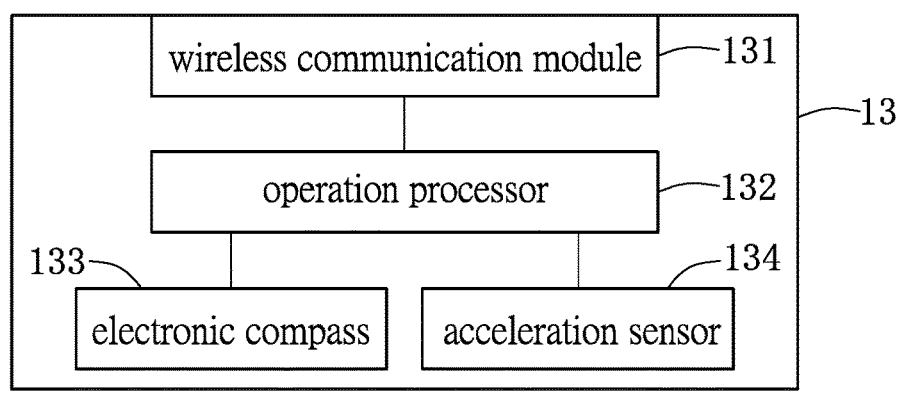
FIG. 2 shows a block diagram of a deployment device according to an embodiment of the instant disclosure.

Please refer to FIG. 2 showing a block diagram of a deployment device according to an embodiment of the instant disclosure. The deployment device 13 has a wireless communication module 131, an operation processor 132, an electronic compass 133 and an acceleration sensor 134. The deployment device 13 can be a mobile device such as a smart phone or a tablet PC for example, but the instant disclosure is not restricted thereto. The operation processor 132 is coupled to the wireless communication module 131, the electronic compass 133 and the acceleration sensor 134. The wireless communication module 141 receives the Bluetooth™ signal BT. The electronic compass 133 senses the geomagnetic field, in order to obtain a north direction DN. The technology of the electronic compass is well known to the person having ordinary skill in the art, thus there is no need to go into detail. The acceleration sensor 134 makes use of the principle of inertia to sense the moving state of the deployment device 13, for example obtaining a forward direction DF of the deployment device. The acceleration sensor 134 can be a G-Sensor usually implemented by micro electro mechanical systems (MEMS) technology, for example. Furthermore, by using the acceleration sensor 134, an inertial navigation system, which is an apparatus calculating displacement distance by measuring acceleration vectors without relying on any external information, can be achieved. The basic principle is, based on Newtonian mechanics, measuring the non-gravitational acceleration by the acceleration sensor, integrating the acceleration vector to obtain the velocity vector, and integrating the velocity vector to obtain the distance vector. In short, by using the linear acceleration provided by the acceleration sensor 134 and the inertial navigation principle, the movement distance of the deployment device 13 can be calculated, thus the movement trajectory of the deployment device 13 can be calculated accordingly, in order to help in performing indoor positioning. However, the instant disclosure does not limit the implementation manners of the electronic compass 133 and the acceleration sensor 134.

Figure 3:
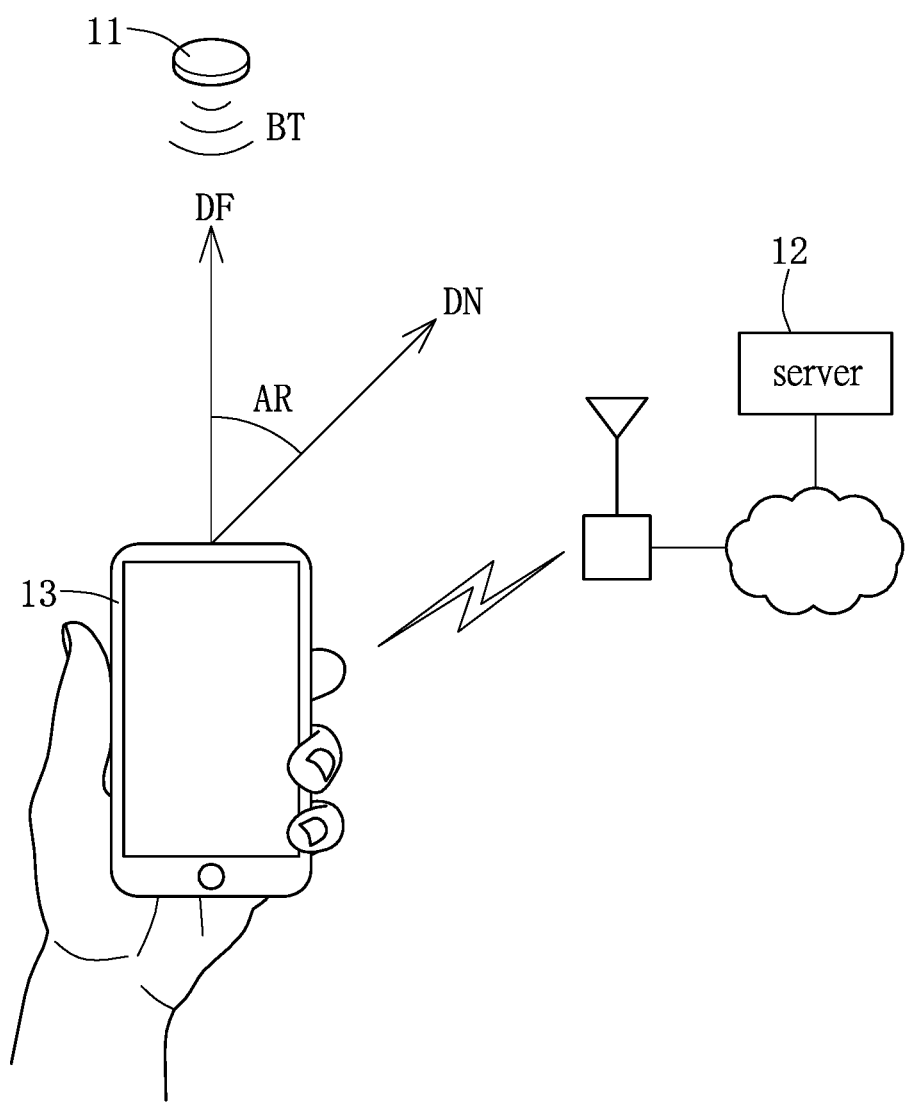
FIG. 3 shows a schematic diagram of using a deployment device during a system construction phase according to an embodiment of the instant disclosure.

Please refer to FIG. 3 showing a schematic diagram of using a deployment device during a system construction phase according to an embodiment of the instant disclosure. In system construction phase, the system construction person can hold (or carry) the deployment device 13 and move the Bluetooth™ device 11 forward, for establishing the standard angle by using the signals between the deployment device 13 and the Bluetooth™ device 11. The location data of the Bluetooth™ device 11 can be input to or built in the system by the system construction person in advance. The deployment device 13 can obtain the identification (ID) of the Bluetooth™ device 11 and send the identification (ID) of the Bluetooth™ device 11 to the server. When the deployment device 13 moves along a forward direction and senses the Bluetooth™ signal BT, the deployment device 13 obtains a detection angle AR of the deployment device 13 by the electronic compass 133 of the deployment device 13 and the acceleration sensor 134 of the deployment device 13. In this embodiment, the mentioned detection angle AR indicates the angle difference between the north direction DN and the forward direction DF of the deployment device 13, which can be named as a north angle. Then, the deployment device 13 transmits the detection angle AR of the deployment device 13 to the server 12, and the server 12 stores the detection angle AR of the deployment device 13 as the standard angle. The server 12 stores and associates the standard angle to the identification (ID) of the Bluetooth™ device 11. The standard angle (detection angle AR) can be used to redefine the coordinate of the Bluetooth™ device 11, for use as a comparison base when the user mobile device 14 senses the Bluetooth™ signal BT, in order to obtain the relative angle of the user mobile device 14 to the Bluetooth™ device 11.

Figure 4:
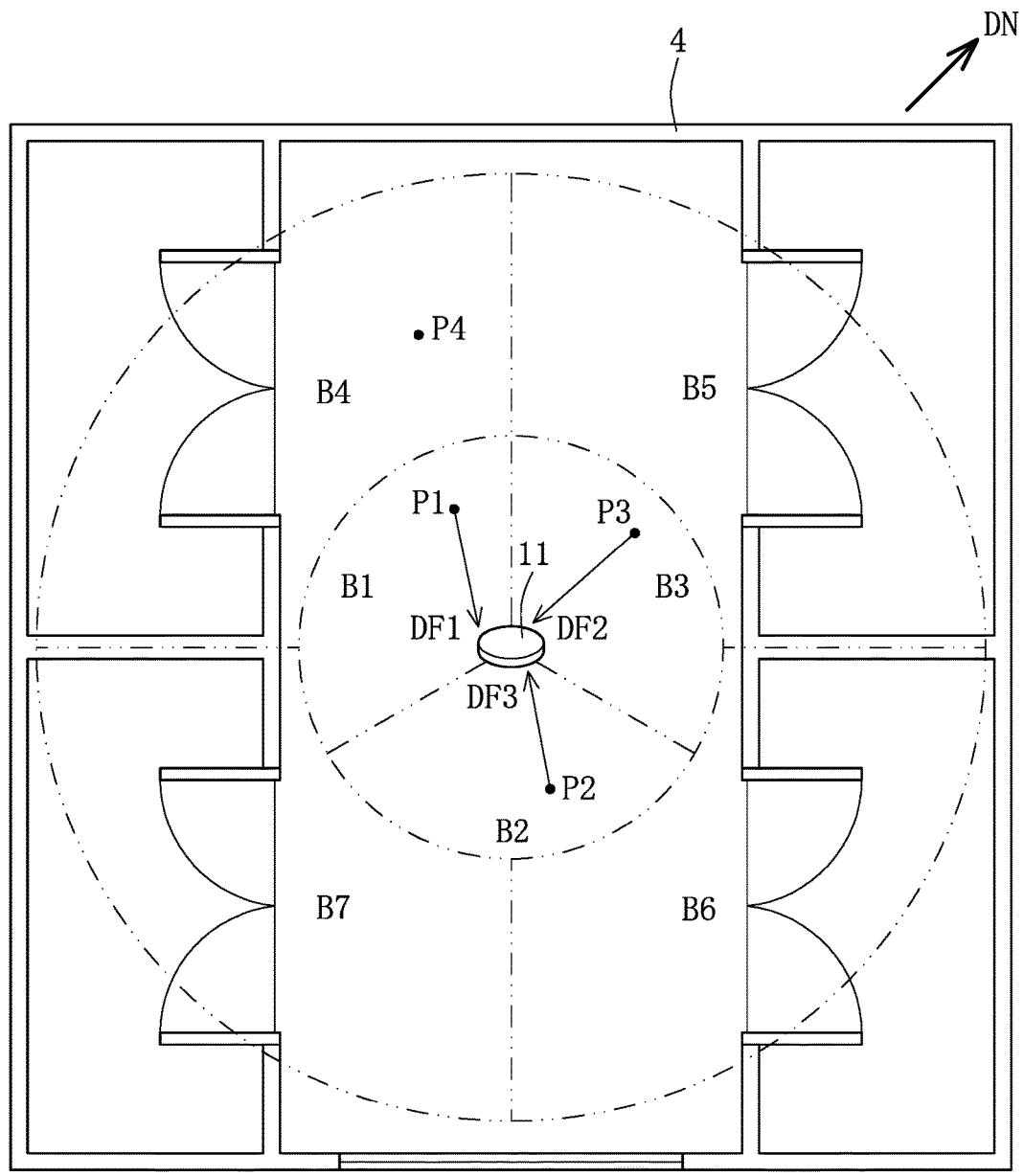
FIG. 4 shows a schematic diagram of regional divisions for an area near the position of a Bluetooth™ device according to an embodiment of the instant disclosure.

For performing information push notification service, in the system, the area around the location of the Bluetooth™ device 11 can be divided into a plurality of regions according to angle and distance, wherein each region can correspond to a different push notification information. For example, referring to FIG. 4 showing a schematic diagram of regional divisions for an area near the position of a Bluetooth™ device according to an embodiment of the instant disclosure, the area nearer to the Bluetooth™ device 11 is divided into three regions B1, B2, and B3. And, the area further from the Bluetooth™ device 11 is divided into four regions B4, B5, B6 and B7. Each region corresponds to specific service information, wherein the service information of each region can be different. For example, if the surroundings of the position of the Bluetooth™ device 11 is a market 4, the system can be configured to provide different service information content for each region in the market 4. In the system construction phase, when the deployment device 13 moves along a forward direction DF1 toward the Bluetooth™ device 11 from the position P1, the detection angle AR1 of the deployment device 13 should correspond to the region B1. In the same way, when the deployment device 13 moves along a forward direction DF2 toward the Bluetooth™ device 11 from the position P2, the detection angle AR2 of the deployment device 13 should correspond to the region B2. When the deployment device 13 moves along a forward direction DF3 toward the Bluetooth™ device 11 from the position P3, the detection angle AR3 of the deployment device 13 should correspond to the region B3, and so on. Because the detected detection angle AR1 at any position in the region B1 has a certain range, the angle range of the detection angle AR1 can be defined to correspond with the region B1. In the same way, the angle range of the detection angle (AR) detected in another range can also correspond to its related region. Furthermore, though there could be more than one region at similar angle ranges, referring to FIG. 4 showing the region B1 and the region B4 have similar angle ranges, it may insufficient to pinpoint the region (or position) where the user is only according to the detection angle. Thus, variations in the intensity of the Bluetooth™ signal can be used to more preciously determine the region (or position) where the user is, which will be further described hereinafter.

It is worth mentioning that, in the system construction phase, the deployment device 13 only has to provide at least one detection angle (AR), and the coordinate can be defined (or determined) accordingly. Referring to FIG. 4 as an example, the server 12 can store the map of the field (or environment) (FIG. 4) where the Bluetooth™ device 11 is located. When placing the deployment device 13 in the region B1 and moving the deployment device 13 toward the Bluetooth™ device 11 for obtaining the detection angle AR1, the system construction person can input the position P1 to the server 12, and the server 12 would associate and store the actual position P1 of the deployment device 13 with the detection angle AR1, thus the position P1 would have corresponded to the detection angle AR1. Therefore, the detection angle AR1 can be the standard angle, and the difference between any other detection angle and the detection angle AR1 represents the angle of the any other detection angle relative to the Bluetooth™ device 11 in space.

Furthermore, server 12 determines a distance of a device receiving the Bluetooth™ signal BT relative to the Bluetooth™ device 11 according to variations in the intensity of the Bluetooth™ signal BT and a calibration transmission power. For example, in the system construction phase, the deployment device 13 detects the Bluetooth™ signal BT at a standard position (such as the position P1 in FIG. 4 for example), the Bluetooth™ signal BT at the same time can be considered as the calibration transmission power, but the instant disclosure is not so restricted. The calibration transmission power can be any predetermined power value. The Bluetooth™ signal BT received by the deployment device 13 represents the distance of the deployment device 13 relative to the Bluetooth™ device 11. The detection angle AR of the deployment device 13 cooperating with variations in the intensity of the Bluetooth™ signal BT can define the position of the deployment device 13 more preciously. Considering an example, also referring to FIG. 4, the position P4 in the region B4 and the position P1 in the region B1 both have the same detection angle, but the intensity of the Bluetooth™ signal BT must obviously be different. Thus, according to the intensity of the Bluetooth™ signal BT, it can be distinguished that the position P1 and the position P4 are respectively at different regions.

Figure 5:
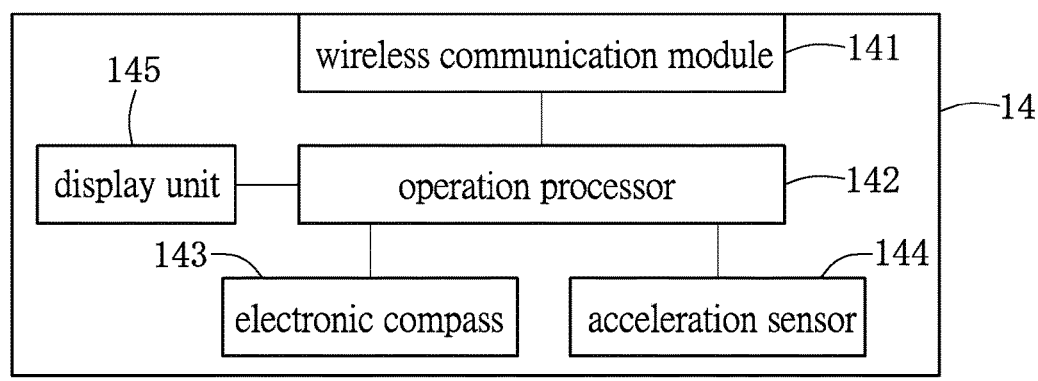
FIG. 5 shows a block diagram of a user mobile device according to an embodiment of the instant disclosure.

Based on the mechanism mentioned above, the user mobile device 14 can use the same mechanism to obtain the detection angle AA of the user mobile device 14. Also, the user mobile device 14 can obtain variations in the intensity of the received Bluetooth™ signal BT. Please refer to FIG. 5. The user mobile device 14 comprises a wireless communication module 141, an operation processor 142, an electronic compass 143, an acceleration sensor 144 and a display unit 145. The user mobile device 14 can be a mobile device such as a smart phone or a tablet PC, but the instant disclosure is not restricted thereto. The operation processor 142 is coupled to the wireless communication module 141, the electronic compass 143, the acceleration sensor 144 and the display unit 145. The wireless communication module 141 receives the Bluetooth™ signal BT. The electronic compass 143 and the acceleration sensor 144 are used to obtain the detection angle AA. The wireless communication module 141 usually has a signal intensity detection module for obtaining the intensity of the Bluetooth™ signal BT.

Figure 6:
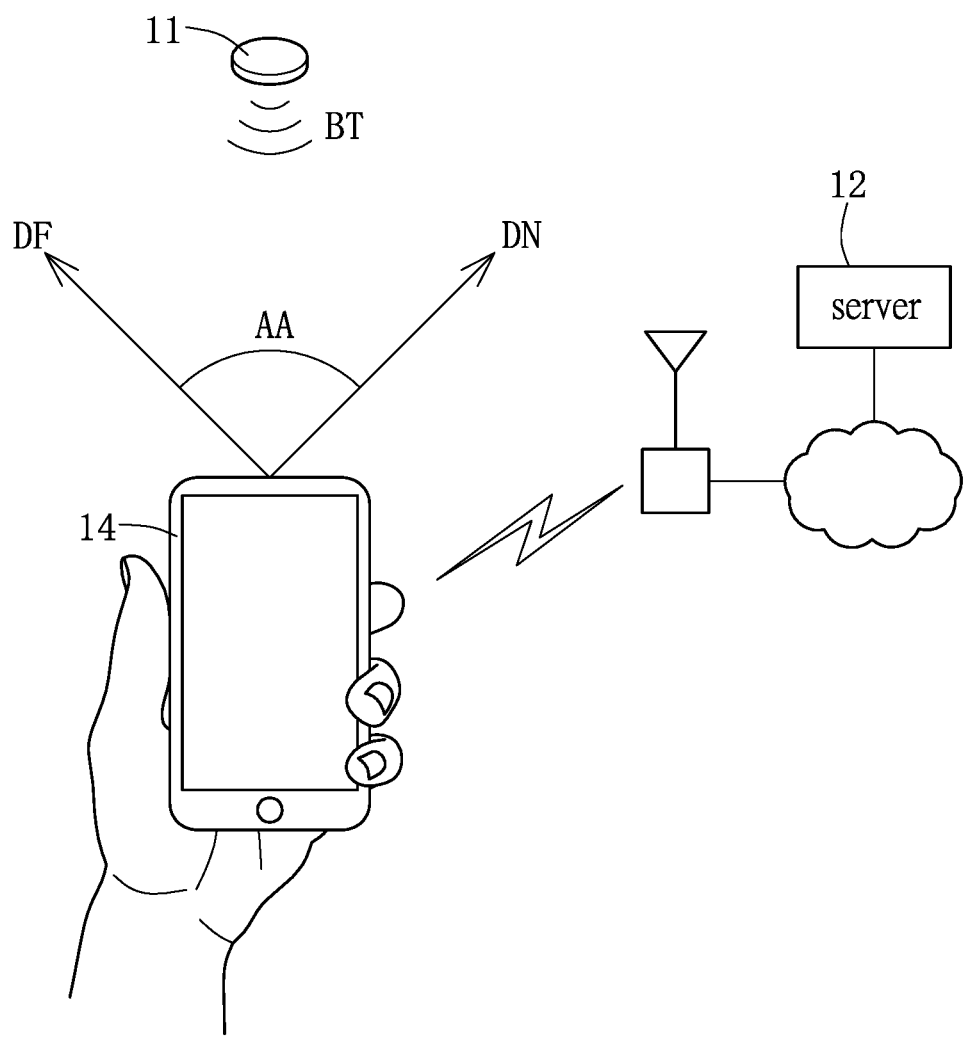
FIG. 6 shows a schematic diagram of obtaining a detection angle at a user mobile device according to an embodiment of the instant disclosure.

Then, please refer to FIG. 6, when the user mobile device 14 senses the Bluetooth™ signal BT, the user mobile device 14 transmits the detection angle AA and the intensity of the Bluetooth™ signal BT to the server 12. Then, the server 12 obtains a relative angle of the user mobile device 14 corresponding to the Bluetooth™ device 11 according to the standard angle AR (which is the detection angle of the deployment device 13) and the detection angle AA of the user mobile device 14. In this embodiment, the server 12 performs coordinate conversion according to the standard angle AR and the detection angle AA for obtaining the relative angle of the user mobile device 14 corresponding to the Bluetooth™ device 11. The server obtains the position of the user mobile device 14 relative to the Bluetooth™ device 11 and determines the service information pushed from the server 12 to the user mobile device 14 according to the relative angle and variations in the intensity of the Bluetooth™ signal BT. The display unit 145 of the user mobile device 14 is used to display the service information from the server 12.

Additionally, in practical applications, the user may not maintain the user mobile device 14 (such as a smart phone) stable or not rotating when the user holds or carries the user mobile device 14. If the user mobile device 14 only uses the electronic compass and the acceleration sensor, it may not be sufficient to obtain the detection angle AA of the user mobile device 14. At the same time, if the user mobile device 14 has a gyroscope (or so called as an angular rate accelerometer), the gyroscope can correct the detection angle AA of the user mobile device against the rotation interference. However, the instant disclosure does not limit the user mobile device 14 to having a gyroscope. The gyroscope is only used for correcting the error of the detection angle.

Figure 7:
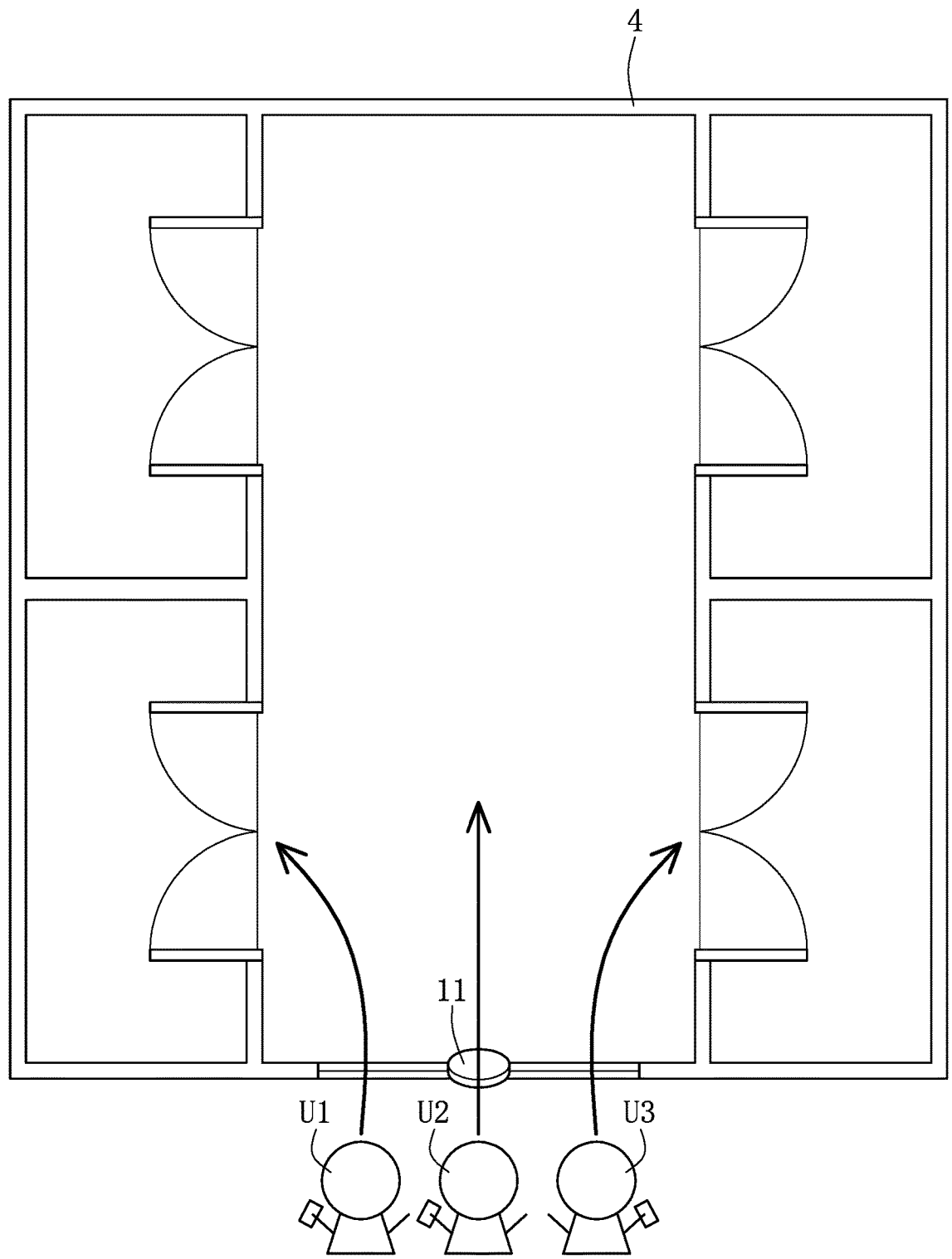
FIG. 7 shows a schematic diagram of trajectories of users' movements near to the position of the Bluetooth™ device according to another embodiment of the instant disclosure.

Furthermore, the acceleration sensor 144 of the user mobile device 14 is further used to obtain a trajectory of the user mobile device 14 for transmitting to the server 12. And, the server 12 determines the service information pushed from the server 12 to the user mobile device 14 according to the relative angle, variations in the intensity of the Bluetooth™ signal BT and the trajectory of the user mobile device 14. The trajectory of the user mobile device 14 responds to the movement path of the user, thus the aforementioned mechanism can acquire the movement path of the user for distinguishing users of different kinds, and providing different service information for each user respectively. In the following, another embodiment is further described, please refer to FIG. 7. FIG. 7 showing a schematic diagram of trajectories of users' movements near to the position of the Bluetooth™ device according to another embodiment of the instant disclosure. The Bluetooth™ device 11 is disposed above a door 5 of a market. The server 12 can determine the move direction of each user mobile device 14 according to the relative angle and variations in the intensity of the Bluetooth™ signal BT, which is used to determine the move direction of the user carrying the user mobile device 14. For example, determining whether the user is going into the door or out of the door, and further determining the move direction after entering the door. As shown in FIG. 7, a user U1 carrying his user mobile device, a user U2 carrying his user mobile device and a user U3 carrying his user mobile device respectively move along different paths. The user U1 is going to the left after entering the market. The user U2 moves straight after entering the market. The user U3 is going to the right after entering the market. Because the users U1, U2 and U3 respectively go ahead in different directions, it can be supposed that the three users can be considered different kinds which may have different information requirements. In the embodiment of FIG. 7, in addition to the relative angle and variations in the intensity of the Bluetooth™ signal BT, the trajectory of the user mobile device can be further used to determine the service information pushed from the server 12 to the user mobile device 14.

In still another embodiment, the intensity of the Bluetooth™ signal BT received by the user mobile device 14 can be converted to obtain the distance between the user mobile device 14 and the Bluetooth™ device 11. Therefore, when the server 12 has already stored the conversion table of the Bluetooth™ signal BT corresponding to the distance, the server 13 can also determine the service information pushed from the server 12 to the user mobile device 14 according to the relative angle and the distance.

[An Embodiment of a Method of Location Push Notification Service]

Figure 8:
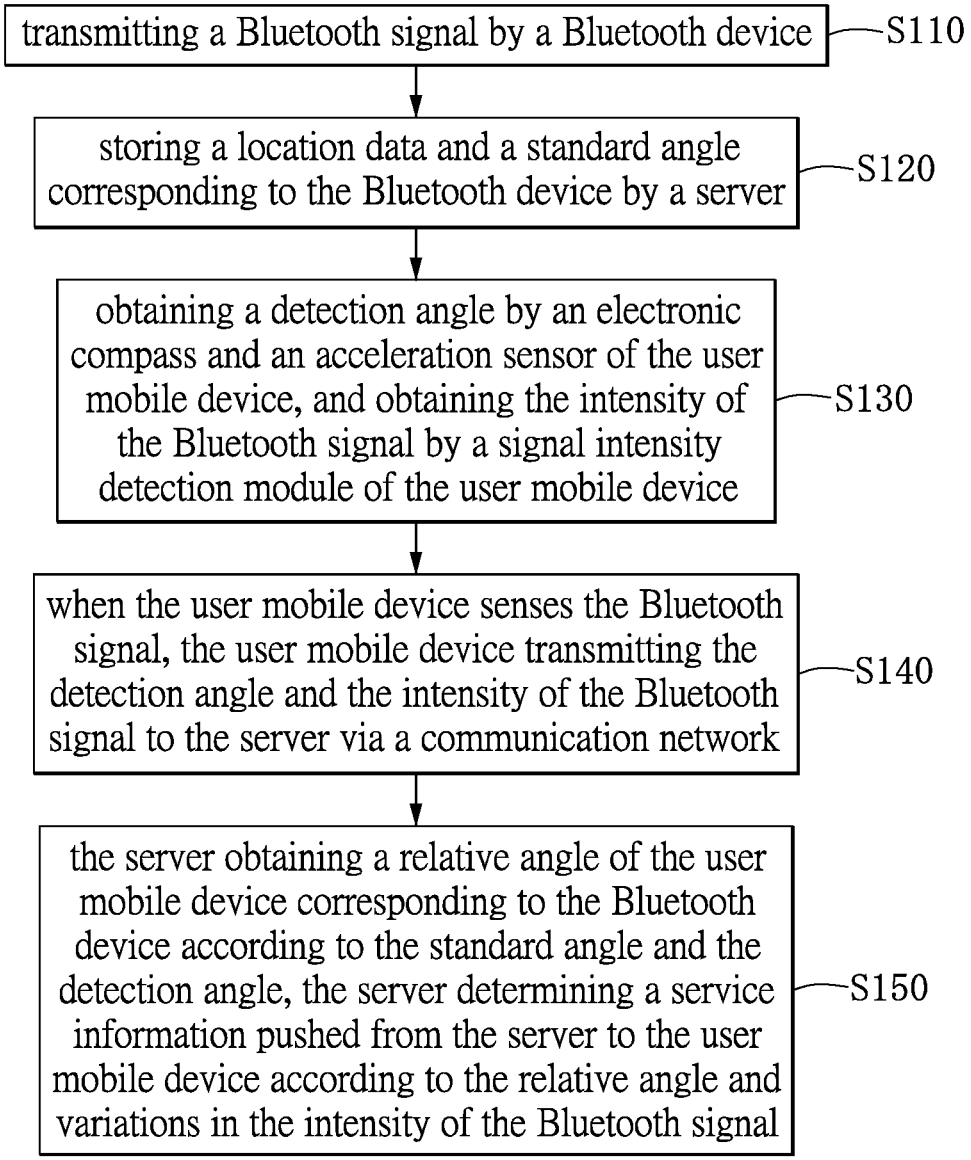
FIG. 8 shows a flow chart of a method of location push notification service according to an embodiment of the instant disclosure.

Please refer to FIG. 8 showing a flow chart of a method of location push notification service according to an embodiment of the instant disclosure. The method of location push notification service can be executed by the system of location push notification service described in the previous embodiment. The method comprises steps as follows. At first, transmitting a Bluetooth™ signal by a Bluetooth™ device (Step S110). Then, storing a location data and a standard angle corresponding to the Bluetooth™ device by a server (step S120). Then, obtaining a detection angle by an electronic compass and an acceleration sensor of the user mobile device, and obtaining the intensity of the Bluetooth™ signal by a signal intensity detection module of the user mobile device (step S130). And, when the user mobile device senses the Bluetooth™ signal, the user mobile device transmitting the detection angle and the intensity of the Bluetooth™ signal to the server via a communication network (step S140). Then, the server obtaining a relative angle of the user mobile device corresponding to the Bluetooth™ device according to the standard angle and the detection angle, the server determining a service information pushed from the server to the user mobile device according to the relative angle and variations in the intensity of the Bluetooth™ signal (step S150).

In the system construction phase, that is before the step S110, the method can further comprise the following steps: providing a deployment device having an electronic compass of the deployment device and an acceleration sensor of the deployment device; when the deployment device moves along a forward direction and senses the Bluetooth™ signal, the deployment device obtaining a detection angle of the deployment device by the electronic compass of the deployment device and the acceleration sensor of the deployment device, the deployment device transmitting the detection angle of the deployment device to the server, and the server storing the detection angle of the deployment device as the standard angle. For detailed descriptions of obtaining the standard angle refer to the previous embodiment.

In one embodiment, the step S150 can be amended to include the steps of determining the service information according to the trajectory of the user mobile device, which is described in the following: obtaining a trajectory of the user mobile device by the user mobile device and transmitting the trajectory to the server; and the server determining the service information pushed from the server to the user mobile device according to the relative angle, variations in the intensity of the Bluetooth™ signal and the trajectory of the user mobile device. For detailed implementation manner of the above steps refer to previous embodiment.

In still another embodiment, the method can further comprise the server determining a distance of the user mobile device relative to the Bluetooth™ device according to variations in the intensity of the Bluetooth™ signal and a calibration transmission power, and then the server determining the service information pushed from the server to the user mobile device according to the relative angle and the distance. For detailed implementation manner of above steps refer to previous embodiment.

In still another embodiment, in the above mentioned step S130, in order to obtain a more accurate detection angle, the method further comprises correcting the detection angle of the user mobile device against the rotation interference by a gyroscope, referring to the previous embodiment.

According to above descriptions, the system of location push notification service, the user mobile device, and the method of location push notification service provided in the embodiments can use only one Bluetooth™ device to obtain the standard angle. Also, at least by using the detection angle of the user mobile device and variations in the intensity of the Bluetooth™ signal, the service information pushed from the server to the user mobile device can be determined. Additionally, the acceleration sensor of the user mobile device can be used to obtain the trajectory of the user mobile device, for further dividing the users into different kinds, so as to determine the service information pushed from the server to the user mobile device.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A system of location push notification service, comprising:
    a Bluetooth device, transmitting a Bluetooth signal;
    a server, storing a location data and a standard angle corresponding to the Bluetooth device; and
    a user mobile device, linked to the server via a communication network, having an electronic compass and an acceleration sensor for obtaining a detection angle, having a signal intensity detection module for obtaining the intensity of the Bluetooth signal, wherein the user mobile device transmits the detection angle and the intensity of the Bluetooth signal to the server when the user mobile device senses the Bluetooth signal, the server obtains a relative angle of the user mobile device corresponding to the Bluetooth device according to the standard angle and the detection angle, the server determines a service information pushed from the server to the user mobile device according to the relative angle and variations in the intensity of the Bluetooth signal.

2. The system of location push notification service according to claim 1, further comprising:
    a deployment device, linked to the server via the communication network, having an electronic compass of the deployment device and an acceleration sensor of the deployment device, wherein when the deployment device moves along a forward direction and senses the Bluetooth signal, the deployment device obtains a detection angle of the deployment device by the electronic compass of the deployment device and the acceleration sensor of the deployment device, the deployment device transmits the detection angle of the deployment device to the server, and the server stores the detection angle of the deployment device as the standard angle.

3. The system of location push notification service according to claim 2, wherein the deployment device is a mobile device.

4. The system of location push notification service according to claim 1, wherein the acceleration sensor of the user mobile device is further used to obtain a trajectory of the user mobile device for transmitting to the server, the server determines the service information pushed from the server to the user mobile device according to the relative angle, variations in the intensity of the Bluetooth signal and the trajectory of the user mobile device.

5. The system of location push notification service according to claim 1, wherein the server determines a distance of the user mobile device relative to the Bluetooth device according to variations in the intensity of the Bluetooth signal and a calibration transmission power.

6. The system of location push notification service according to claim 5, wherein the server determines the service information pushed from the server to the user mobile device according to the relative angle and the distance.

7. The system of location push notification service according to claim 1, wherein the user mobile device further has a gyroscope for correcting the detection angle of the user mobile device against the rotation interference.

8. The system of location push notification service according to claim 1, wherein the user mobile device further has a display unit for displaying the service information.

9. A user mobile device, used in a system of location push notification service, the system of location push notification service comprising a server and a Bluetooth device, the server storing a location data and a standard angle corresponding to the Bluetooth device, the Bluetooth device transmitting a Bluetooth signal, wherein the user mobile device comprises:
    an electronic compass;
    an acceleration sensor, obtaining a detection angle according to the electronic compass;
    a signal intensity detection module, obtaining the intensity of the Bluetooth signal;
    a display unit, for display of a service information; and
    an operation processor, coupled to the electronic compass, the acceleration sensor, the signal intensity detection module and the display unit, wherein when the user mobile device senses the Bluetooth signal, the user mobile device transmits the detection angle and the intensity of the Bluetooth signal to the server, the server obtains a relative angle of the user mobile device corresponding to the Bluetooth device according to the standard angle and the detection angle, the server determines the service information pushed from the server to the user mobile device according to the relative angle and variations in the intensity of the Bluetooth signal.

10. The user mobile device according to claim 9, wherein the acceleration sensor of the user mobile device is further used to obtain a trajectory of the user mobile device for transmitting to the server, the server determines the service information pushed from the server to the user mobile device according to the relative angle, variations in the intensity of the Bluetooth signal and the trajectory of the user mobile device.

11. The user mobile device according to claim 9, wherein the server determines a distance of the user mobile device relative to the Bluetooth device according to variations in the intensity of the Bluetooth signal and a calibration transmission power.

12. The user mobile device according to claim 11, wherein the server determines the service information pushed from the server to the user mobile device according to the relative angle and the distance.

13. The user mobile device according to claim 9, wherein the user mobile device further comprises:
    a gyroscope for correcting the detection angle of the user mobile device against the rotation interference.

14. A method of location push notification service, comprising:
    transmitting a Bluetooth signal by a Bluetooth device;
    storing a location data and a standard angle corresponding to the Bluetooth device by a server;
    obtaining a detection angle by an electronic compass and an acceleration sensor of the user mobile device, and obtaining the intensity of the Bluetooth signal by a signal intensity detection module of the user mobile device;

when the user mobile device senses the Bluetooth signal, the user mobile device transmitting the detection angle and the intensity of the Bluetooth signal to the server via a communication network; and the server obtaining a relative angle of the user mobile device corresponding to the Bluetooth device according to the standard angle and the detection angle, the server determining a service information pushed from the server to the user mobile device according to the relative angle and variations in the intensity of the Bluetooth signal.

15. The method of location push notification service according to claim 14, further comprising:

providing a deployment device having an electronic compass of the deployment device and an acceleration sensor of the deployment device;

when the deployment device moves along a forward direction and senses the Bluetooth signal, the deployment device obtaining a detection angle of the deployment device by the electronic compass of the deployment device and the acceleration sensor of the deployment device, the deployment device transmitting the detection angle of the deployment device to the server, and the server storing the detection angle of the deployment device as the standard angle.

16. The method of location push notification service according to claim 14, further comprising:

obtaining a trajectory of the user mobile device by the user mobile device and transmitting the trajectory to the server; and the server determining the service information pushed from the server to the user mobile device according to the relative angle, variations in the intensity of the Bluetooth signal and the trajectory of the user mobile device.

17. The method of location push notification service according to claim 14, further comprising:

the server determining a distance of the user mobile device relative to the Bluetooth device according to variations in the intensity of the Bluetooth signal and a calibration transmission power.

18. The method of location push notification service according to claim 17, further comprising:

the server determining the service information pushed from the server to the user mobile device according to the relative angle and the distance.

19. The method of location push notification service according to claim 14, further comprising:

correcting the detection angle of the user mobile device against the rotation interference by a gyroscope.

* * * * *